United States Patent
Yang et al.

(10) Patent No.: US 12,019,771 B2
(45) Date of Patent: Jun. 25, 2024

(54) METHOD, APPARATUS, DEVICE AND MEDIUM FOR PROTECTING SENSITIVE DATA

(71) Applicant: Lemon Inc., Grand Cayman (KY)

(72) Inventors: Xin Yang, Los Angeles, CA (US); Junyuan Xie, Beijing (CN); Jiankai Sun, Los Angeles, CA (US); Yuanshun Yao, Los Angeles, CA (US); Chong Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/539,851

(22) Filed: Dec. 14, 2023

(65) Prior Publication Data

US 2024/0126899 A1    Apr. 18, 2024

Related U.S. Application Data

(63) Continuation of application No. PCT/SG2022/050708, filed on Oct. 3, 2022.

(30) Foreign Application Priority Data

Nov. 23, 2021    (CN) .......................... 202111393707.X

(51) Int. Cl.
*G06F 21/62*    (2013.01)
*G06N 3/04*    (2023.01)
*G06N 3/098*    (2023.01)

(52) U.S. Cl.
CPC .............. *G06F 21/62* (2013.01); *G06N 3/04* (2013.01); *G06N 3/098* (2023.01)

(58) Field of Classification Search
None
See application file for complete search history.

(56) References Cited

U.S. PATENT DOCUMENTS

| 2018/0268283 A1* | 9/2018 | Gilad-Bachrach ...... G06F 17/18 |
| 2021/0034971 A1* | 2/2021 | Han ........................ G06N 3/045 |

(Continued)

FOREIGN PATENT DOCUMENTS

| CN | 109784091 A | 5/2019 |
| CN | 111783142 A | 10/2020 |

(Continued)

OTHER PUBLICATIONS

International Search Report and Written Opinion, International Patent Application No. PCT/SG2022/050708, Jun. 5, 2023, with English translation of Search Report (13 pages).

*Primary Examiner* — Leon Flores
(74) *Attorney, Agent, or Firm* — HSML P.C

(57) ABSTRACT

There are proposed a method, device, apparatus, and medium for protecting sensitive data. In a method, to-be-processed data is received from a server device. A processing result of a user for the to-be-processed data is received, the processing result comprising sensitive data of the user for the processing of the to-be-processed data. A gradient for training a server model at the server device is determined based on a comparison between the processing result and a prediction result for the to-be-processed data. The gradient is updated in a change direction associated with the gradient so as to generate an updated gradient to be sent to the server device. Noise is added only in the change direction associated with the gradient. The corresponding overhead of processing noise in a plurality of directions can be reduced, and no excessive noise data interfering with training will be introduced to the updated gradient.

20 Claims, 10 Drawing Sheets

(56) References Cited

U.S. PATENT DOCUMENTS

2022/0360539 A1* 11/2022 Chen .................. H04L 45/70
2023/0118785 A1* 4/2023 Ullah .................. G06N 3/088
                                                                                                    706/25

FOREIGN PATENT DOCUMENTS

| CN | 112333216 A | 2/2021 |
| CN | 112347476 A | 2/2021 |
| CN | 113449872 A | 9/2021 |

\* cited by examiner

METHOD, APPARATUS, DEVICE AND MEDIUM FOR PROTECTING SENSITIVE DATA

This application is a continuation of International Patent Application No. PCT/SG2022/050708, filed on Oct. 3, 2022, which claims priority to Chinese Application No. 202111393707.X entitled "method, device, apparatus and medium for protecting sensitive data" filed with the Chinese Patent office on Nov. 23, 2021, both of which are incorporated herein by reference in their entities.

FIELD

Example implementations of the present disclosure generally relate to the field of computers, and in particular, to a method, device, apparatus, and computer readable storage medium for protecting sensitive data during training of a machine learning model.

BACKGROUND

With the development of machine learning technology, machine learning technology has been applied in various industries. Processing models for specific functions can be trained based on pre-collected training data. However, some training data might involve user privacy and/or other sensitive data. At this time, how to collect training data in a more secure way and use it to train processing models has become a research hotspot. Currently, technical solutions have been proposed to add noise to training data including sensitive information, but the performance of existing technical solutions is not satisfactory, so sensitive information leakage cannot be effectively prevented.

SUMMARY

According to example implementations of the present disclosure, a solution for protecting sensitive data is provided.

In a first aspect of the present disclosure, a method of protecting sensitive data is provided. In the method, to-be-processed data is received from a server device. A processing result of a user for the to-be-processed data is received, the processing result comprising sensitive data of the user for the processing of the to-be-processed data. A gradient for training a server model at the server device is determined based on a comparison between the processing result and a prediction result for the to-be-processed data. The gradient is updated in a change direction associated with the gradient so as to generate an updated gradient to be sent to the server device.

In a second aspect of the present disclosure, an electronic device is provided, comprising: at least one processing unit; and at least one memory, coupled to the at least one processing unit and storing instructions for execution by the at least one processing unit, the instructions, when executed by the at least one processing unit, causing a device to perform acts, including: receiving to-be-processed data from a server device; receiving a processing result of a user for the to-be-processed data, the processing result comprising sensitive data of the user for the processing of the to-be-processed data; determining a gradient for training a server model at the server device based on a comparison between the processing result and a prediction result for the to-be-processed data; and updating the gradient in a change direction associated with the gradient so as to generate an updated gradient to be sent to the server device.

In a third aspect of the present disclosure, an apparatus for protecting sensitive data is provided. The apparatus comprises: a data receiving module, configured for receiving to-be-processed data from a server device; a result receiving module, configured for receiving a processing result of a user for the to-be-processed data, the processing result comprising sensitive data of the user for the processing of the to-be-processed data; a gradient determining module, configured for determining a gradient for training a server model at the server device based on a comparison between the processing result and a prediction result for the to-be-processed data; and an update generating module, configured for updating the gradient in a change direction associated with the gradient so as to generate an updated gradient to be sent to the server device.

In the fourth aspect of the present disclosure, a computer-readable storage medium is provided. A computer program is stored on the medium. The program, when executed by a processor, performs a method in the first aspect.

It would be understood that the content described in the Summary section of the present disclosure is neither intended to identify key or essential features of implementations of the present disclosure, nor is it intended to limit the scope of the present disclosure. Other features of the present disclosure will be readily envisaged through the following description.

BRIEF DESCRIPTION OF THE DRAWINGS

Through the detailed description with reference to the accompanying drawings, the above and other features, advantages, and aspects of respective implementations of the present disclosure will become more apparent. The same or similar reference numerals represent the same or similar elements throughout the figures, wherein.

DETAILED DESCRIPTION

Figure 1:
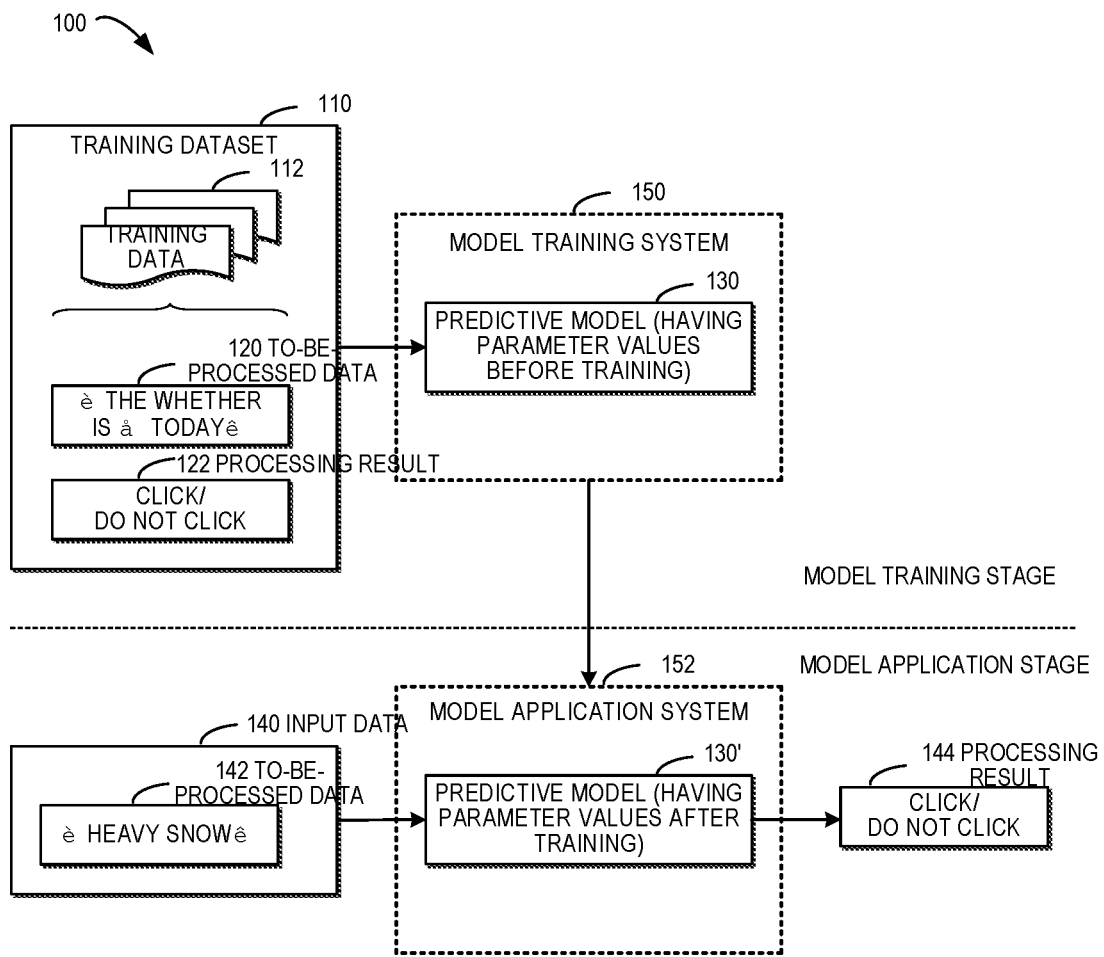
FIG. 1 shows a block diagram of an example environment in which the implementations of the present disclosure can be implemented.

The following will describe the implementation of the present disclosure in more detail with reference to the accompanying drawings. Although some implementation methods of the present disclosure are shown in the drawings, it should be understood that the present disclosure can be implemented in various forms and should not be construed as limited to the implementation methods set forth herein. On the contrary, these implementation methods are provided for a more thorough and complete understanding of the present disclosure. It should be understood that the drawings and implementation methods of the present disclosure are for illustrative purposes only and are not intended to limit the scope of protection of the present disclosure.

In the description of the implementation of this disclosure, the term "including" and similar terms should be understood as open-ended inclusion, that is, "including but not limited to". The term "based on" should be understood as "at least partially based on". The terms "one implementation" or "the implementation" should be understood as "at least one implementation". The term "some implementation" should be understood as "at least some implementation". The following may also include other explicit and implicit definitions.

As used herein, the term "model" can learn the correlation between corresponding inputs and outputs from training data and thus generate corresponding outputs for given inputs after training is completed. The model can be generated based on machine learning technology. Deep learning is a machine learning algorithm that processes inputs and provides corresponding outputs by using multi-layer processing units. A neural network model is an example of a deep learning-based model. As used herein, the "model" can also be referred to as "machine learning model", "learning Model", "machine learning network", or "learning network", and these terms can be used interchangeably in the text.

"Neural networks" are a type of machine learning network based on deep learning.

The "neural network" can handle inputs and provide corresponding outputs and it usually includes an input layer, an output layer and one or more hidden layers between the input and output layers. The neural network used in the deep learning applications usually includes a plurality of hidden layers to extend the depth of the network. Individual layers of the neural network model are connected in sequence, such that an output of a preceding layer is provided as an input for a following layer, where the input layer receives the input of the neural network while the output of the output layer acts as the final output of the neural network. Each layer of the neural network includes one or more nodes (also referred to as processing nodes or neurons) and each node processes the input from the preceding layer.

Usually, machine learning can roughly include three stages, namely training stage, testing stage, and application stage (also referred to as inference stage). In the training stage, a given model can be trained using a large amount of training data, and parameter values are iteratively updated until the model can obtain consistent inference that meets the expected goals from the training data. Through training, the model can be considered to be able to learn the correlation between input and output (also referred to as input-to-output mapping) from the training data. The parameter values of the trained model are determined. In the testing stage, test inputs are applied to the trained model to test whether the model can provide correct outputs, thereby determining the performance of the model. In the application stage, the model can be used to process actual inputs based on the parameter values obtained from training, to determine the corresponding output.

In the field of machine learning, a predictive model can be trained with a training dataset including a large amount of training data, thereby enabling the predictive model to perform the desired function. For example, in the field of information push, information of interest can be pushed to the user. If the user is interested in the pushed information, the user can click and open the pushed information, otherwise the user may ignore the pushed information. The predictive model can be trained with training data, so that the predictive model may push corresponding information of interest to different users. However, during obtaining the training data, sensitive user information might be involved. Hereinafter, an example environment according to an example implementation of the present disclosure will be described first with reference to FIG. 1.

Example Environment

FIG. 1 shows a block diagram of an example environment 100 in which implementations of the present disclosure can be implemented. In the environment 100 of FIG. 1, it is desirable to train and use a model (i.e., a predictive model 130) that is configured for predicting which data to be pushed to the user. As shown in FIG. 1, the environment 100 includes a model training system 150 and a model application system 152. The upper part of FIG. 1 shows the process of the model training stage, and the lower part shows the process of the model application stage. Prior to training, the parameter values of the predictive model 130 may have initial values, or may have pre-trained parameter values obtained through a pre-training process. Through the training process, the parameter values of the predictive model 130 may be updated and adjusted. After the training is completed, a predictive model 130' may be obtained. At this point, the parameter values of the predictive model 130' have been updated, and based on the updated parameter values, the predictive model 130 may be used to predict tasks during the application stage.

During the model training stage, the predictive model 130 may be trained using a model training system 150 based on a training dataset 110 including a plurality of training data 112. Here, each training data 112 may relate to a two-tuple format and include to-be-processed data 120 (e.g., pushed data about weather and/or other content) and processing results 122 (i.e., whether the user clicks on the pushed data). In the context of the present disclosure, various details according to an example implementation of the present disclosure will be described using only a predictive model related to the data push function as an example. According to an example implementation of the present disclosure, the predictive model may also be used to achieve different functions.

The predictive model 130 can be trained with the training data 112 including the to-be-processed data 120 and the processing results 122. Specifically, the training process can be iteratively performed using a large amount of training data. After training is completed, the predictive model 130 can recommend corresponding interesting data to different users. In the model application stage, the predictive model 130' (at this time, the predictive model 130' has trained parameter values) can be called using the model application system 152. For example, input data 140 (including to-be-processed data 142) can be received, and a prediction result 144 as to whether the user will click on the to-be-processed data 142 can be output. Only data for which the prediction result 144 is a "click" may be recommended to the user by using the predictive model 130'.

In FIG. 1, the model training system 150 and the model application system 152 may include any computing system with computing power, such as various computing devices/systems, terminal devices, servers, etc. Terminal devices may involve any type of mobile terminals, fixed terminals, or portable terminals, including mobile phones, desktop computers, laptops, notebook computers, netbook computers, tablet computers, media computers, multimedia tablets, or any combination of the foregoing, including accessories and peripherals of these devices, or any combination thereof. Servers include, but not limited to, mainframes, edge computing nodes, computing devices in cloud environments, etc.

It should be understood that the components and arrangements in the environment 100 shown in FIG. 1 are merely examples, and a computing system suitable for implementing the example implementations described herein may include one or more different components, other components, and/or different arrangements. For example, although shown as separate, the model training system 150 and the model application system 152 may be integrated in the same system or device. The implementations of the present disclosure are not limited in this regard. Example implementations of the model training and model application will be described, respectively, with reference to the drawings.

It will be understood that the training process requires a large amount of training data, and the training data might include sensitive information such as user preferences. Distributed machine learning technology has been proposed. For example, server devices and client devices can have their own machine learning models, and server devices can send model parameters and push data to client devices. Users can process pushed data at their client devices (for example, users can "click" or "not click" on pushed data). At this time, processing results including users' personal sensitive information are only stored at client devices and will not be sent to other devices.

In distributed machine learning, the client device can include complete training data, that is, the to-be-processed data 120 (or its encoding) and the processing result 122. The client device can determine gradient information used for updating the predictive model and send the gradient information to the server device. At this time, the sensitive information does not leave the user's client device, but only the gradient information is sent to the server device. However, attackers can use techniques such as white-box attacks to recover the original sensitive information from the gradient information. In order to further protect sensitive information, it has been proposed to add noise to the gradient information to prevent the leakage of sensitive information. However, noise data requires extra resource overhead, and excessive noise might affect the accuracy of the training data and further reduce the performance of the training process. Therefore, it is desirable to protect sensitive information in a more effective way.

Model Training Architecture

In order to at least partially solve the defects of the above technical solution, according to the implementations of the present disclosure, a method of protecting sensitive data during the training process is proposed. Hereinafter, a summary according to an example implementation of the present disclosure is first described with reference to FIG. 2. This figure shows a block diagram 200 of the training process performed based on a client/server architecture according to some implementations of the present disclosure. Here, the predictive model is not trained at a single computing device, but the predictive model may include a client model 214 and a server model 224, and training may be performed using both the client device 210 and the server device 220 in a distributed way.

Figure 2:
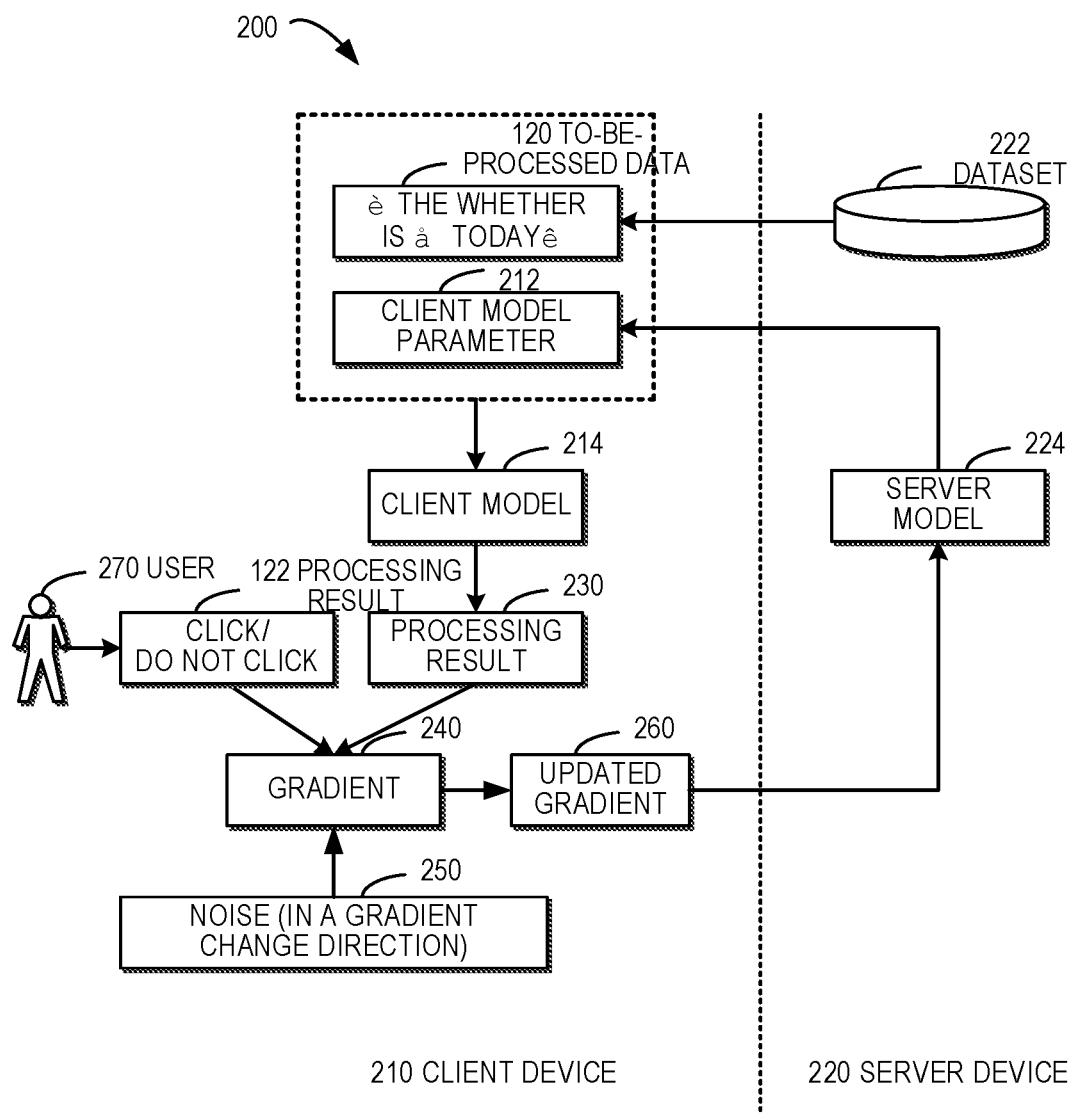
FIG. 2 shows a block diagram of performing the training process based on a client/server architecture according to some implementations of the present disclosure.

The left side of FIG. 2 shows the processing on the client device 210 side, and the right side of FIG. 2 shows the processing on the server device 220 side. The server device may include a dataset 222 storing to-be-processed data and a server model 224. The server device 220 may select to-be-processed data from the dataset 222 and send the to-be-processed data to the client device 210. The to-be-processed data 120 herein may include various types of data, including but not limited to weather forecasts, news, traffic conditions, and other information that may be of interest to the user. It will be understood that the to-be-processed data 120 herein may include pushed data and/or its encoding (e.g., embedding), and the encoding may be determined based on various encoders that are currently known and/or to be developed in the future.

Further, the server device 220 may send a client model parameter 212 to the client device 210, so that the client device 210 can use the parameter to configure the local client model 214. Further, the client device 210 may use the configured client model 214 to process the to-be-processed data 120 and obtain a prediction result 230. A user 270 may click or not click on the to-be-processed data 120 according to his/her preferences, and the real processing result 122 (i.e., the user label) can be obtained at the client device 210. The client device 210 may determine a loss gradient 240 for updating the predictive model based on a comparison between the prediction result 230 and the processing result 122 from the user 270.

In this model training process, since the processing result 122 includes sensitive information of the user 270, the processing result 122 is only stored at the client device 210 without being sent to other computing devices. In order to strengthen the protection for the gradient 240 and prevent attackers from inferring the sensitive information in the processing result 122 from the gradient 240, the present disclosure proposes to introduce noise 250 only in the gradient change direction to generate an updated gradient 260. At this time, the noise 250 in the gradient change direction can increase the difficulty for attackers to obtain sensitive information, and one the other hand, can reduce unnecessary interference on the training process from excessive noise and ensure that the predictive model can be trained along the direction of the loss gradient change.

Figure 3:
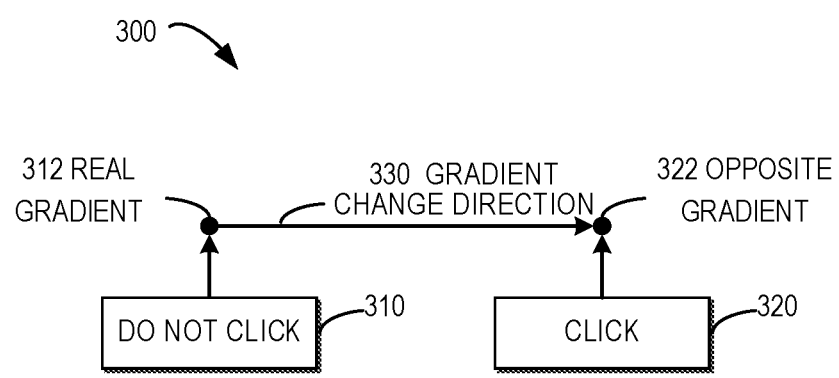
FIG. 3 shows a block diagram for determining a gradient change direction according to some implementations of the present disclosure.

Hereinafter, more details according to an example implementation of the present disclosure will be described with reference to FIG. 3. Compared with existing solutions that introduce noise in all directions, according to an example implementation of the present disclosure, noise is introduced only in the gradient change direction. First of all, description is presented to how to determine the gradient change direction with reference to FIG. 3, which shows a block diagram 300 for determining the gradient change direction according to some implementations of the present disclosure. Specifically, a change direction associated with a gradient can be determined based on a set of candidate results associated with to-be-processed data. Hereinafter, description regarding how to determine the gradient change direction will be presented using binary processing results (e.g., "click" and "do not click") as examples. As shown in FIG. 3, in an example of sending to-be-processed data (e.g., represented as x) to a user, a set of candidate results (e.g., represented as y) can be obtained: "do not click (y=0)" 310 and "click (y=1)" 320. At this time, the training data can be represented as (x, y).

Further, gradients associated with the above two candidate results can be determined separately. According to an example implementation of the present disclosure, the client model parameter 212 for setting the client model 214 can be received from the server device 220. Further, the client model 214 can be configured using the received parameter, so as to process the to-be-processed data 120 and obtain the prediction result 230.

Further, a gradient for training the server model 224 at the server device may be determined based on a comparison between the prediction result 230 and the real processing result 122 from the user 270. According to an example implementation of the present disclosure, a set of gradients associated with the set of candidate results may be determined, respectively. That is, the "do not click" 310 and "click" 320 may be compared with the prediction result 230, respectively. Assuming that the user 270 does not click on the pushed data, a real gradient 312 may be determined based on the "do not click" 310, and an opposite gradient 322 that is opposite to the real gradient may be determined based on the "click" 320.

Here, the real gradient 312 and the opposite gradient 322 represent: when the user 270 performs different operations, the predictive model will be trained in two different directions. The difference between the obtained two gradients can be determined, and then the change direction associated with the gradient can be determined. As shown in FIG. 3, assuming that the real gradient 312 and the opposite gradient 322 are represented as vectors $g_0$ and $g_1$, respectively, then the gradient change direction is represented as $g_1-g_0$. As shown in FIG. 3, the arrow between the real gradient 312 and the opposite gradient 322 shows a gradient change direction 330.

According to an example implementation of the present disclosure, the gradient change direction may be determined based on the following formula:

$$D = g_{1-y} - g_y \quad \text{Formula 1}$$

Herein D denotes the gradient change direction, $g_y$ denotes a gradient determined based on the real processing result of the user, and $g_{1-y}$ denotes a gradient determined based on another candidate processing result in the case of binary classification.

Noise data can be introduced in the gradient change direction 330 to increase the difficulty for attackers to obtain sensitive information and reduce the success rate of attackers. According to an example implementation of the present disclosure, an updated gradient can be generated based on the gradient and the change direction. Specifically, the updated gradient can be generated based on the following formula:

$$g = f_1(g_y, D) \quad \text{Formula 2}$$

Herein g denotes the updated gradient, $g_y$ denotes a gradient determined based on the real processing result of the user, D denotes the gradient change direction, and $f_1$ denotes a function associated with $g_y$ and D. The specific representation of this function can be determined based on multiple ways, which will be further described in detail below. Formula 1 can be substituted into Formula 2, where the updated gradient can be determined based on Formula 3.

$$g = f_2(g_y, (g_{1-y} - g_y)) \quad \text{Formula 3}$$

Herein g denotes the updated gradient, $g_y$ denotes a gradient determined based on the real processing result of the user, $g_{1-y}$ denotes a gradient determined based on another candidate processing result in the case of binary classification, and $f_2$ denotes a function associated with $g_y$ and $g_{1-y}$, which will be further described in detail below.

According to an example implementation of the present disclosure, a noise factor for updating the gradient can be determined. Here, the noise factor can represent the intensity of the introduced noise, and the larger the noise factor, the greater the intensity of the introduced noise. The updated gradient can be generated based on the gradient, the noise factor, and the change direction. Specifically, the magnitude of the noise can be determined based on a product of the noise factor and the offset of the gradient in the change direction determined based on a set of candidate results. Further, the updated gradient can be determined based on the nose and the real gradient determined based on the real processing result of the user.

According to an example implementation of the present disclosure, the updated gradient may be determined based on the following Formula 4:

$$g = g_y + u \cdot (g_{1-y} - g_y) \quad \text{Formula 4}$$

The meanings of various symbols in Formula 4 are the same as those in the formula described above, and u denotes the noise factor.

In Formula 4, $g_{1-y} - g_y$ can be represented as a vector, which not only represents the gradient change direction determined based on different candidate results but also represents the magnitude of gradient change. That is, the two endpoints of the vector respectively represent the gradient when the user performs a "click" or "do not click" operation. Each point in the vector can represent the gradient change during the user performing a "click" and "do not click" operation. Therefore, when the noise factor in Formula 4 has different values, different updated gradients will be generated. Specifically, the noise factor can be determined based on Boolean random variables or Gaussian random variables.

According to an example implementation of the present disclosure, the noise factor can be determined based on a Boolean random variable. Here, the Boolean random variable can represent a numerical value of 0 and 1. Specifically, the value of the Boolean random variable can be defined based on the following Formula 5.

$$\Pr[u=1] = \epsilon, \text{ and } \Pr[u=0] = 1 - \epsilon \quad \text{Formula 5}$$

Herein, Pr denotes the probability formula, u denotes the noise factor, and $\epsilon$ denotes a real number between 0 and 1. In other words, Formula 5 represents that the value of the noise factor u can be taken from 1 or 0, wherein the probability u=1 is $\epsilon$, and the probability u=0 is $1-\epsilon$.

Figure 4A:
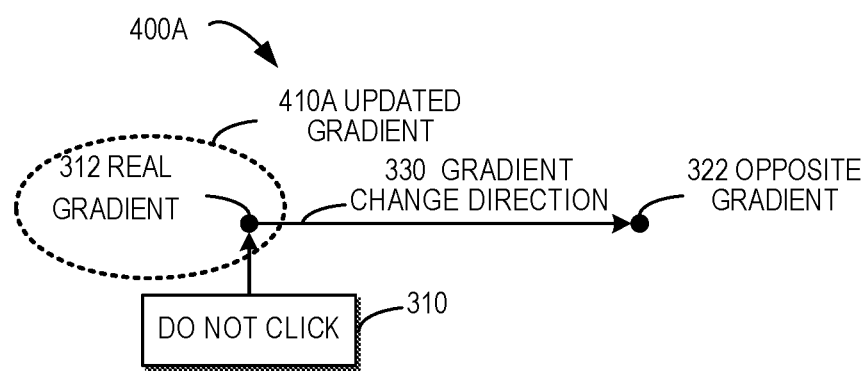
FIG. 4A shows a block diagram for determining an updated gradient based on a Boolean random variable according to some implementations of the present disclosure.

In the following, specific examples of determining the updated gradient based on a Boolean random variable will be described with reference to FIGS. 4A and 4B, respectively. FIG. 4A shows a block diagram 400A for determining an updated gradient based on a Boolean random variable according to some implementations of the present disclosure. As shown in FIG. 4A, assuming that the user's real processing result is "do not click" 310, when u=0, $g=g_y$, it can be determined based on Formula 4. At this time, an updated gradient 410A is the same as the real gradient based on the user's real processing result, that is, located at the starting point of the gradient change direction.

Figure 4B:
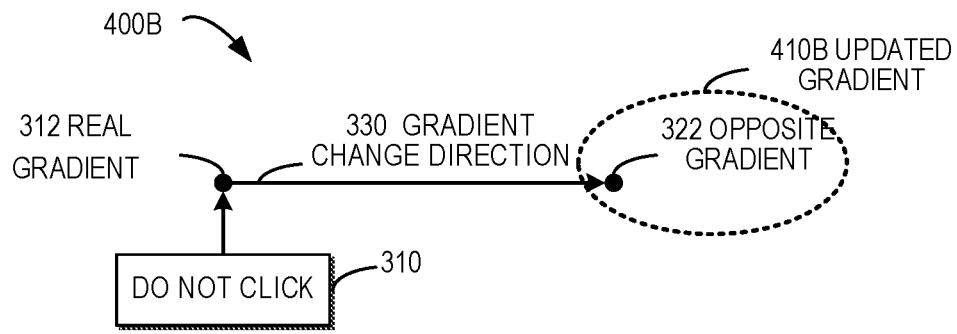
FIG. 4B shows a block diagram for determining an updated gradient based on a Boolean random variable according to some implementations of the present disclosure.

FIG. 4B illustrates a block diagram 400B for determining an updated gradient based on a Boolean random variable according to some implementations of the present disclosure. As shown in FIG. 4B, assuming that the user's real processing result is "do not click" 310, when u=1, g=$g_y$+ ($g_{1-y}$-$g_y$) is determined based on Formula 4. At this time, an updated gradient 410B is $g_{1-y}$, and is opposite to the real gradient based on the user's real processing result, that is, at the ending point of the gradient change direction. With the example implementation of the present disclosure, the real gradient 312 or the opposite gradient 322 can be provided to the server device 220. In this way, noise data can be added to the updated gradient in a simple and effective manner, thereby reducing the probability that an attacker successfully obtains sensitive information.

In the above example, the updated gradient 410A is the same as the real gradient when u=0, and the updated gradient 420B is the opposite of the real gradient when u=1. It will be understood that although the opposite gradient can interfere with the attacker's judgment, too much interference will cause the gradient used for actual training to be inaccurate, making it difficult to obtain an accurate predictive model with limited time and computing resources. Therefore, the occurrence of the opposite gradient should be appropriately limited.

According to an example implementation of the present disclosure, in order to ensure that the updated gradient can represent the correct gradient determined based on the real processing result in most cases, the range of values of ϵ should be further restricted. For example, it can be defined that ϵ<½. At this time, the success probability of the attacker is 1−ϵ, and an attack AUC (Area Under Curve) parameter is $(1-\epsilon)^2+\epsilon(1-\epsilon)=1-\epsilon$.

It will be understood that the attack AUC is a parameter defined in the context of the present disclosure that represents a cracking success rate of attackers. In scenarios where attackers crack real label data, attackers can set a scoring function that generates a corresponding score for each sample. A threshold $t_0$ can be selected, and if t>$t_0$, the real label is considered to be 1, otherwise it is 0. For the known $t_0$, the attacker's true positive rate or false positive rate can be considered. However, when the threshold $t_0$ is unknown, all thresholds can be traversed and a curve of the true positive rate relative to the false positive rate can be generated. For specific protection methods used to generate updated gradients, the larger the AUC of the generated curve, the more accurate the scoring function is, and an area of 1 indicates complete correctness.

With an example implementation of the present disclosure, by limiting the range of values of ϵ, the updated gradient may reflect the true label of the user in most cases, so that the predictive model can be caused to perform prediction toward the direction consistent with the real training data.

According to an example implementation of the present disclosure, the noise factor can be determined based on Gaussian random variables. Specifically, the noise factor can be determined based on the following Formula 6:

$$u \sim \mathcal{N}(0, \epsilon^2) \quad \text{Formula 6}$$

Herein u denotes the noise factor, and $\mathcal{N}$ denotes a Gaussian distribution function with the distribution amplitude E. Hereinafter, more details of determining the noise factor based on the Gaussian random variable will be described with reference to FIG. 5.

Figure 5:
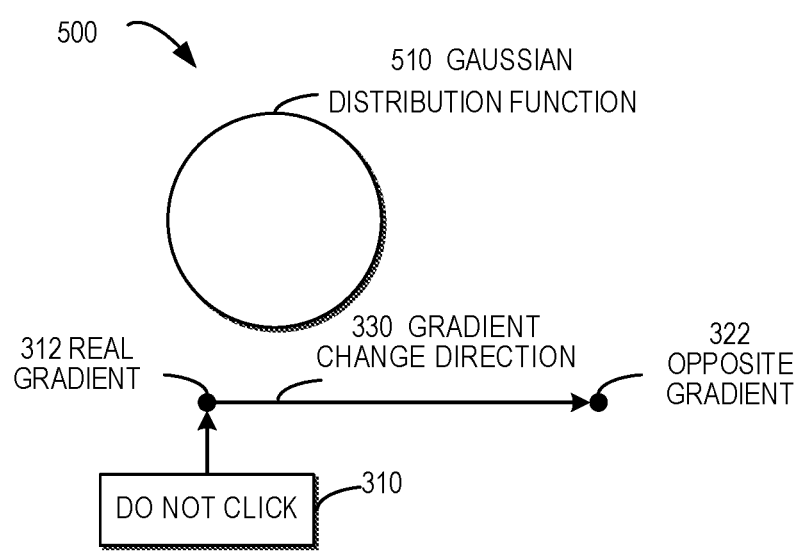
FIG. 5 shows a block diagram for determining an updated gradient based on a Gaussian random variable according to some implementations of the present disclosure.

FIG. 5 shows a block diagram 500 for determining AN updated gradient based on Gaussian random variables according to some implementations of the present disclosure. As shown in FIG. 5, a specific value of the noise factor u can be determined based on a Gaussian distribution function 510. Here, the noise factor u can be represented by high-dimensional data and involves a plurality of directions. Since only the gradient in the gradient change direction 330 helps to obtain a better training result, the noise factor u can be mapped to the gradient change direction 330 without considering components in other directions. In this way, values with different gradients can be selected from the gradient change direction 330 as the updated gradient. For example, a gradient located at a distance ratio of 3:7 (or other positions closer to the real gradient 312) to the real gradient 312 and the opposite gradient 322 in the gradient change direction 330 can be selected. In other words, in most cases, the updated gradient should be located closer to the real gradient 312 in the gradient change direction 330.

With the example implementation of the present disclosure, noise is added only in the gradient change direction 330 without other directions than the gradient change direction being considered. In this way, on the one hand, the relevant computational overhead of noise components in other directions can be reduced, and on the other hand, the interference of noise components in other directions on the training results can be reduced. The updated gradient closer to the real gradient 312 in the gradient change direction 330 can provide a beneficial contribution to improving the accuracy of the predictive model. The updated gradient closer to the opposite gradient 322 can increase the difficulty of the attacker's cracking process, thereby reducing the success rate of the attacker.

According to an example implementation of the present disclosure, the range of values of E can be further restricted so that the updated gradient determined based on Gaussian random variables is closer to the real gradient 312. The noise factor should meet the following condition: the updated gradient calculated based on the noise factor is closer to the real gradient 312 than to the opposite gradient 322. In other words, the probability that the distance between the updated gradient and the real gradient is less than the distance between the updated gradient and the opposite gradient (i.e., other candidate gradient in a set of candidate gradients different from the gradient) should not be less than ½. ϵ that makes u<½ can be determined based on a method that is currently known and/or will be developed in the future. In this case, the attacker's failure probability is:

$$Pr\left[\|g - g_y\|_2^2 \geq \|g - g_{1-y}\|_2^2\right] = Pr\left[\langle g_{1-y} - g_y, (2u-1)(g_{1-y}-g_y)\rangle \geq 0\right] \quad \text{Formula 7}$$

$$= Pr\left[u \geq \frac{1}{2}\right]$$

$$= \int_{\frac{1}{2}}^{\infty} \frac{1}{\sqrt{2\pi\epsilon^2}} e^{-\frac{x^2}{2\epsilon^2}} dx$$

-continued $$\sim \left(\frac{\epsilon}{2} \pm \frac{\epsilon^2}{8}\right)\frac{e^{-2/\epsilon^2}}{\sqrt{2\pi}}$$

The meanings of various symbols in Formula 7 are the same as those in the formula described above, and at this time, the attack AUC parameter is Pr[u<½].

Figure 6:
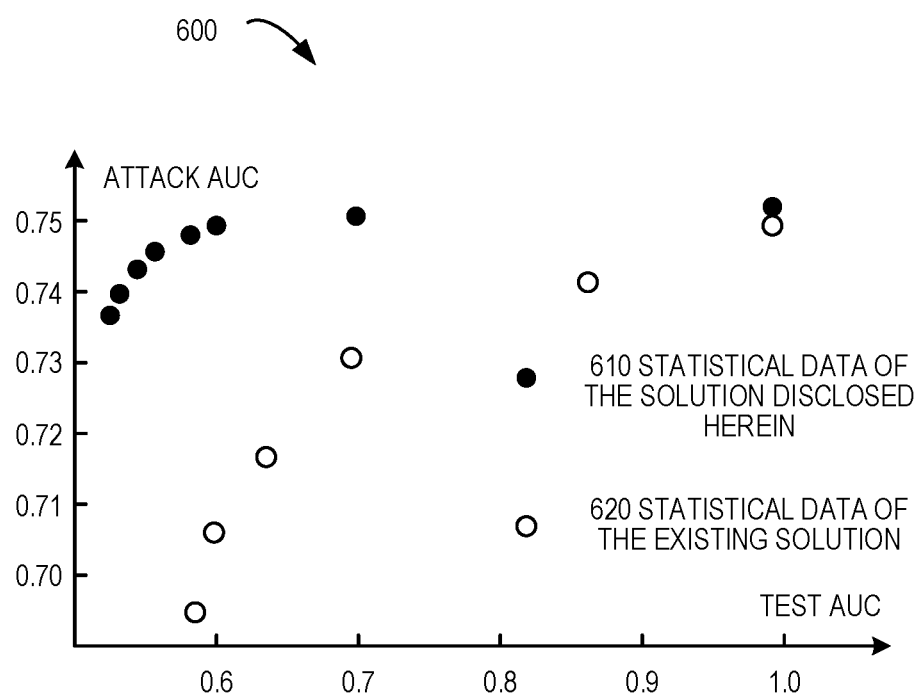
FIG. 6 shows a block diagram of statistical data according to some implementations of the present disclosure.

Compared to existing technical solutions that introduce noise to the gradient in a plurality of directions, introducing noise only in the gradient change direction can be more helpful in preventing attackers from success. FIG. 6 shows a block diagram 600 of statistical data according to some implementations of the present disclosure, wherein the ordinate represents the attack AUC described above, and the abscissa represents the test AUC. Here, the test AUC is an indicator for measuring the predictive model, and it may be determined based on test samples in a test dataset whether the trained predictive model is accurate. As shown in FIG. 6, a legend 610 represents statistical data of the comparison between the attack AUC and the test AUC determined according to the technical solution of the present disclosure, and a legend 620 represents statistical data of the comparison between the attack UC and the test AUC determined according to the existing technical solution. As shown in FIG. 6, a curve corresponding to the legend 610 is above a curve corresponding to the legend 620. Therefore, compared with the existing technical solution, the technical solution of the present disclosure can better protect sensitive data while ensuring the performance of the predictive model.

According to an example implementation of the present disclosure, after the updated gradient has been obtained, the updated gradient can be sent to the server device 220 so that the server device 220 can determine a client model parameter used to set the client model in the next iteration process based on the updated gradient. According to an example implementation of the present disclosure, the process described above can be iteratively performed until the predictive model meets a predetermined convergence condition. At this time, the server device 220 can send new parameters to the client device 210 in each iteration process so that the client device can determine a gradient and corresponding updated gradient based on the new parameters. The above process can be repeated continuously until the predetermined convergence condition is met. At this time, since the updated gradient includes noise data, it is difficult for attackers to perform the cracking process, and thus sensitive data in the original processing results can be protected.

Description has been presented above regarding the server device 220 sending single to-be-processed data 120 to the client device 210 and obtaining the corresponding updated gradient. According to an example implementation of the present disclosure, the process described above can be performed in batch mode. For example, the client device 210 can receive a training data packet including a plurality of to-be-processed data from the server device 220. Further, the client device 210 can perform processing with respect to each to-be-processed data in the training data packet. Specifically, the client device 210 can display each to-be-processed data and receive a processing result from the user for each to-be-processed data. The gradient change direction can be determined according to a similar process described above, and the gradient can be updated in the determined gradient change direction. At this time, a plurality of updated gradients can be generated.

According to an example implementation of the present disclosure, the process described above can be iteratively performed according to a predetermined batch size. Assuming the batch size is n, the server device can send n to-be-processed data to the client device at a time. After processing, the client device can return n updated gradients to the server device at a time. Then, the server device can use the received updated gradient to perform the training process. According to an example implementation of the present disclosure, the server device can update the server model parameter in the direction of the updated gradient. Furthermore, the client device parameter sent to the client device can be determined based on the updated parameter.

According to an example implementation of the present disclosure, the method described above can be implemented at a client device connected to a server, and the method can be iteratively performed until a predetermined convergence condition is reached.

Figure 7:
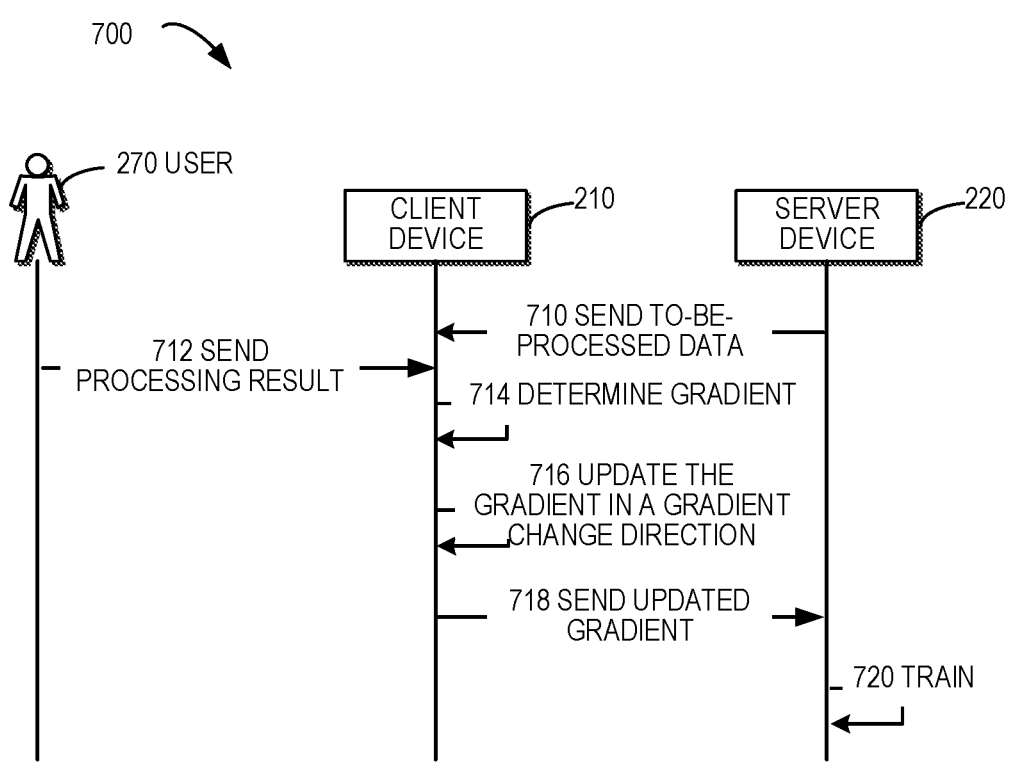
FIG. 7 shows a block diagram of an interaction process for protecting sensitive data according to some implementations of the present disclosure.

Hereinafter, the interaction process between various entities is described with reference to FIG. 7. This figure shows a block diagram 700 of the interaction process for protecting sensitive data according to some implementations of the present disclosure. As shown in FIG. 7, the server device 220 can send 710 to-be-processed data to the client device 210. For example, only one to-be-processed data can be sent at a time, or a plurality of to-be-processed data can be sent at a time in batch processing mode. The client device 210 can display the to-be-processed data to the user 270, and the user 270 can send 712 a processing result to the client device 210. After receiving the processing result, the client device 210 can determine 714 a relevant loss gradient based on the comparison between a true value and a predictive value of the processing result. Further, the client device 210 can determine a corresponding layer change direction and update 716 the gradient only in the gradient change direction. Further, the client device 210 can send 718 the updated gradient to the server device 220. After receiving the updated gradient, the server device 220 can perform training 720 by using the updated gradient.

It will be understood that the process for protecting sensitive data has only been described as an example using labels including binary classifications. According to an example implementation of the present disclosure, labels from users can also include more classifications. For example, users can score the processing (e.g., a score of 1-100), etc. A plurality of gradient change directions can be determined in a similar way. Assuming that labels from users involve k+1 candidate classifications, at which point gradients $g_0, g_1, \ldots, g_k$ associated with each candidate classification can be determined. Then, the plurality of gradient change directions can be determined based on $g_1-g_0, g_2-g_0, \ldots, g_k-g_0$ respectively.

Further, the corresponding noise factor can be determined using the Boolean random variable or Gaussian random variable described above, respectively. Subsequently, the updated gradient corresponding to the real user label can be determined in each gradient change direction in a similar way. It will be understood that the number of candidate classifications here should be less than the dimension represented by the vector of the training data, otherwise too many gradient change directions will degrade the method disclosed herein to adding noise in all directions.

With the example implementation of the present disclosure, the processing result including sensitive information of the user 270 will not leave the client device 210, but is processed locally on the client device 210 to obtain an updated gradient. Here, the updated gradient only includes noise data in the gradient change direction that helps to improve training efficiency. Compared with the existing solution of adding noise data in all directions, on the one hand, the corresponding overhead of processing noise in a plurality of directions can be reduced, and on the other hand, it can be ensured that no much noise data will be introduced to the updated gradient.

Model Application Architecture

While the training of the predictive model 130 has been described above, the trained predictive model 130' can be provided to the model application system 152 as shown in FIG. 1 so as to process the input data 140. It will be understood that although the updated gradient used in the training process includes noise data, noise data exists only in the gradient change direction. Further, by using noise factors to control the intensity of noise data, the direction of the updated gradient is consistent with that of the real gradient, so that the predictive model can be trained in a direction that makes the predictive model consistent with the real user label. In this way, the trained prediction model 130' can have higher accuracy, thereby providing an accurate basis for subsequent model application processes.

According to an example implementation of the present disclosure, after the model training stage has been completed, the trained prediction model 130' with trained parameter values can be used to process the received input data. For example, the to-be-processed data 142 may be inputted to the predictive model 130'. At this time, the predictive model 130' can output the prediction result 144 as to whether the user will click on the to-be-processed data. Specifically, only the data of interest can be pushed to the user. For example, assuming that the predictive model 130' indicates that the user 270 always clicks on weather-related pushed data, then weather data can be pushed to the user 270 in priority. For another example, assuming that the predictive model 130' indicates that the user 270 rarely opens pushed data related to sports news, then the frequency of pushing sports news can be reduced. In this way, the trained predictive model 130' can have higher accuracy, thereby providing a judgment basis for subsequent push operations.

Example Process

Figure 8:
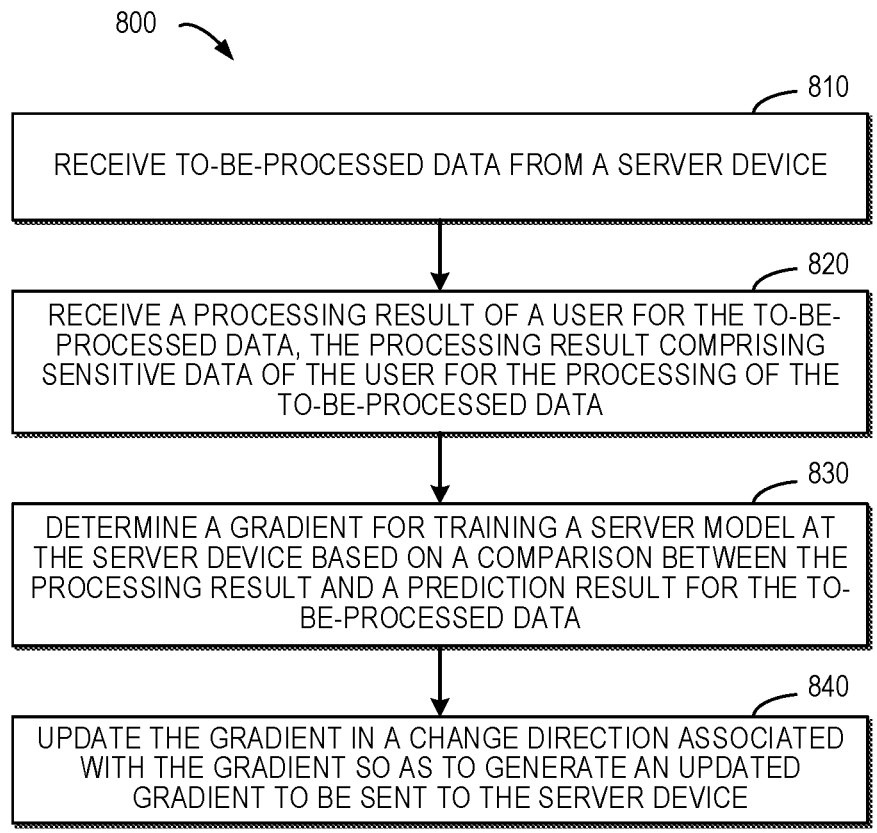
FIG. 8 shows a flowchart of a method for protecting sensitive data according to some implementations of the present disclosure.

FIG. 8 shows a flowchart of a method 800 for protecting sensitive data according to some implementations of the present disclosure. Specifically, at a block 810, the to-be-processed data is received from a server device.

At a block 820, a processing result of a user for the to-be-processed data is received, the processing result comprises sensitive data of the user for the processing of the to-be-processed data.

At a block 830, a gradient for training a server model at the server device is determined based on a comparison between the processing result and a prediction result for the to-be-processed data. According to an example implementation of the present disclosure, in order to determine the gradient, a client model parameter for setting a client model is received from the server device. Further, the to-be-processed data is processed based on the client model parameter and the client model so as to obtain the prediction result for the to-be-processed data.

According to an example implementation of the present disclosure, the updated gradient is sent to the server device, so that the server device determines the client model parameter for setting the client model according to the updated gradient.

At a block 840, the gradient is updated in a change direction associated with the gradient so as to generate an updated gradient to be sent to the server device. According to an example implementation of the present disclosure, in order to generate the updated gradient, the change direction associated with the gradient is determined based on a set of candidate results associated with the to-be-processed data. Then, the updated gradient is generated based on the gradient and the change direction.

According to an example implementation of the present disclosure, in order to determine the change direction associated with the gradient, a set of gradients is determined associated with the set of candidate results respectively; and the change direction associated with the gradient is determined based on a difference between the set of gradients.

According to an example implementation of the present disclosure, in order to determine the updated gradient, a noise factor for updating the gradient is determined, the noise factor representing the intensity of noise data introduced into the gradient. Then, the updated gradient is determined based on the gradient, the noise factor and the change direction.

According to an example implementation of the present disclosure, in order to determine the noise factor, the noise factor is determined based on a Boolean random variable, the noise factor causing a probability that the updated gradient is equal to the gradient to be no less than ½.

According to an example implementation of the present disclosure, in order to determine the noise factor, the noise factor is determined based on a Gaussian random variable. Here, the noise factor causing a probability to be no less than ½, the probability indicates that a distance between the updated gradient and the gradient is less than a distance between the updated gradient and other candidate gradient than the gradient in the set of candidate gradients.

According to an example implementation of the present disclosure, the to-be-processed data is included in a training data packet from the server device, and the method further comprises: processing other to-be-processed data in the training data packet by means of the method.

According to an example implementation of the present disclosure, the method 800 is performed at a client device connected to the server, and the method is iteratively performed at the client device.

Example Apparatus and Devices

Figure 9:
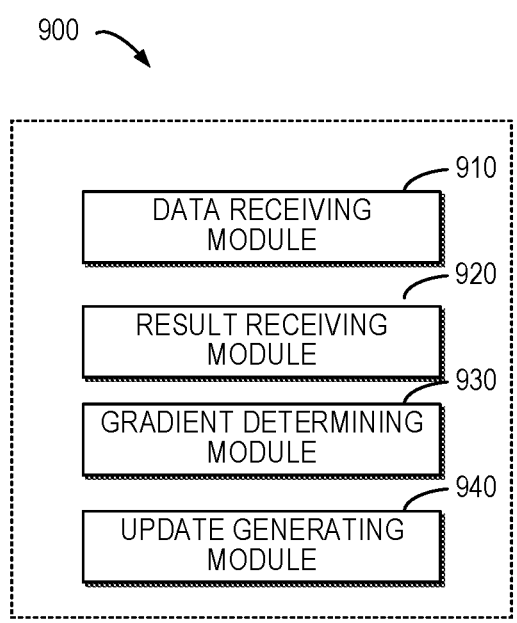
FIG. 9 shows a block diagram of an apparatus for protecting sensitive data according to some implementations of the present disclosure.

FIG. 9 shows a block diagram of an apparatus 900 for protecting sensitive data according to some implementations of the present disclosure. As shown in FIG. 9, the apparatus 900 comprises: a data receiving module 910, a result receiving module 920, a gradient determining module 930, an update generating module 940.

According to an example implementation of the present disclosure, the data receiving module 910 is configured for receiving to-be-processed data from a server device; the result receiving module 920 is configured for receiving a processing result of a user for the to-be-processed data, the processing result comprising sensitive data of the user for the processing of the to-be-processed data; the gradient determining module 930 is configured for determining a gradient for training a server model at the server device based on a comparison between the processing result and a prediction result for the to-be-processed data; and the an update generating module 940 is configured for updating the gradient in a change direction associated with the gradient so as to generate an updated gradient to be sent to the server device.

According to an example implementation of the present disclosure, the gradient determining module 930 is further configured for receiving a client model parameter for setting a client model from the server device; and processing the to-be-processed data based on the client model parameter and the client model so as to obtain the prediction result for the to-be-processed data.

According to an example implementation of the present disclosure, the apparatus 900 further comprises: a sending module, configured for sending the updated gradient to the server device, so that the server device determines the client model parameter for setting the client model according to the updated gradient.

According to an example implementation of the present disclosure, the update generating module 940 is further configured for determining the change direction associated with the gradient based on a set of candidate results associated with the to-be-processed data; and generating the updated gradient based on the gradient and the change direction.

According to an example implementation of the present disclosure, the update generating module 940 is further configured for determining a set of gradients associated with the set of candidate results respectively; and determining the change direction associated with the gradient based on a difference between the set of gradients.

According to an example implementation of the present disclosure, the update generating module 940 is further configured for determining a noise factor for updating the gradient, the noise factor representing the intensity of noise data introduced into the gradient; and generating the updated gradient based on the gradient, the noise factor and the change direction.

According to an example implementation of the present disclosure, the update generating module 940 is further configured for determining the noise factor based on a Boolean random variable, the noise factor causing a probability that the updated gradient is equal to the gradient to be no less than $\frac{1}{2}$.

According to an example implementation of the present disclosure, the update generating module 940 is further configured for determining the noise factor based on a Gaussian random variable, the noise factor causing a probability to be no less than $\frac{1}{2}$, the probability indicates that a distance between the updated gradient and the gradient is less than a distance between the updated gradient and other candidate gradient than the gradient in the set of candidate gradients.

According to an example implementation of the present disclosure, the to-be-processed data is included in a training data packet from the server device, and the apparatus 900 further comprises: a calling module, configured for processing other to-be-processed data in the training data packet by the above modules.

According to an example implementation of the present disclosure, the apparatus 900 is performed at a client device connected to the server, and the apparatus 900 is iteratively performed at the client device.

Figure 10:
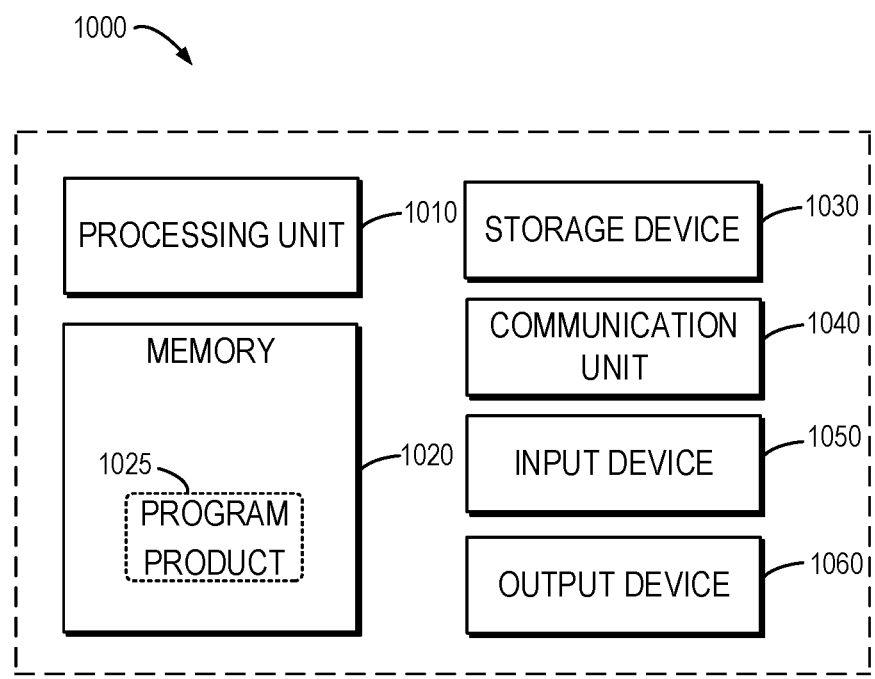
FIG. 10 shows a block diagram of a device in which a plurality of implementations of the present disclosure can be implemented.

FIG. 10 shows a block diagram of a device in which a plurality of implementations of the present disclosure can be implemented. It would be understood that the electronic device 1000 shown in FIG. 10 is only an example and should not constitute any restriction on the function and scope of the implementations described herein. The device 1000 may be used for implementing the model training system 150, as well as the model application system 152 in FIG. 1.

As shown in FIG. 10, the electronic device 1000 is in the form of a general computing device. The components of the electronic device 1000 may comprise but are not limited to, one or more processors or processing units 1010, a memory 1020, a storage device 1030, one or more communication units 1040, one or more input devices 1050, and one or more output devices 1060. The processing unit 1010 may be an actual or virtual processor and can execute various processes according to the programs stored in the memory 1020. In a multiprocessor system, a plurality of processing units execute computer executable instructions in parallel to improve the parallel processing capability of the electronic device 1000.

The electronic device 1000 typically comprises a variety of computer storage medium. Such medium may be any available medium that is accessible to the electronic device 1000, comprising but not limited to volatile and non-volatile medium, removable, and non-removable medium. The memory 1020 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 1030 may be any removable or non-removable medium and may comprise a machine-readable medium, such as a flash drive, a disk, or any other medium, which can be used to store information and/or data (such as training data for training) and can be accessed within the electronic device 1000.

The electronic device 1000 may further comprise additional removable/non-removable, volatile/non-volatile storage medium. Although not shown in FIG. 10, a disk driver for reading from or writing to a removable, non-volatile disk (such as a "floppy disk"), and an optical disk driver for reading from or writing to a removable, non-volatile optical disk can be provided. In these cases, respective driver may be connected to the bus (not shown) by one or more data medium interfaces. The memory 1020 may comprise a computer program product 1025, which has one or more program modules configured to perform various methods or acts of various implementations of the present disclosure.

The communication unit 1040 communicates with a further computing device through the communication medium. In addition, functions of components in the electronic device 1000 may be implemented by a single computing cluster or a plurality of computing machines, which can communicate through a communication connection. Therefore, the electronic device 1000 may be operated in a networking environment with a logical connection with one or more other servers, a network personal computer (PC), or another network node.

The input device 1050 may be one or more input devices, such as a mouse, a keyboard, a trackball, etc. The output device 1060 may be one or more output devices, such as a display, a speaker, a printer, etc. The electronic device 1000 may also communicate with one or more external devices (not shown) through the communication unit 1040 as required.

The external device, such as a storage device, a display device, etc., communicates with one or more devices that enable users to interact with the electronic device 1000, or communicate with any device (for example, a network card, a modem, etc.) that makes the electronic device 1000 communicate with one or more other computing devices. Such communication may be executed via an input/output (I/O) interface (not shown).

According to the example implementation of the present disclosure, a computer-readable storage medium is provided, on which a computer-executable instruction or computer program is stored, wherein the computer-executable instructions or the computer program is executed by the processor to implement the method described above. According to the example implementation of the present disclosure, a computer program product is also provided. The computer program product is physically stored on a non-transient computer-readable medium and comprises computer-executable instructions, which are executed by the processor to implement the method described above. According to the example implementation of the present disclosure, a computer program product is provided, on which computer program is stored and the program implements the method described above when executed by a processor.

Various aspects of the present disclosure are described herein with reference to the flow chart and/or the block diagram of the method, the device, the equipment, and the computer program product implemented according to the present disclosure. It would be understood that respective block of the flowchart and/or the block diagram and the combination of respective blocks in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device, and/or other devices to work in a specific way. Therefore, the computer-readable medium containing the instructions comprises a product, which comprises instructions to implement various aspects of the functions/acts specified in one or more blocks in the flowchart and/or the block diagram.

The computer-readable program instructions may be loaded onto a computer, other programmable data processing apparatus, or other devices, so that a segment of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions, and operations of the system, the method, and the computer program product implemented according to the present disclosure. In this regard, respective block in the flowchart or the block diagram may represent a part of a module, a program segment, or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that respective block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Respective implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application, or improvement of technology in the market of respective implementation, or to enable other ordinary skills in the art to understand the various implementations disclosed herein.

We claim:

1. A method of protecting sensitive data, comprising:
receiving to-be-processed data from a server device;
receiving a processing result of a user for the to-be-processed data, the processing result comprising sensitive data of the user for the processing of the to-be-processed data;
determining a gradient for training a server model at the server device based on a comparison between the processing result and a prediction result for the to-be-processed data; and
updating the gradient in a change direction associated with the gradient so as to generate an updated gradient to be sent to the server device.

2. The method of claim 1, further comprising:
receiving a client model parameter for setting a client model from the server device; and
processing the to-be-processed data based on the client model parameter and the client model so as to obtain the prediction result for the to-be-processed data.

3. The method of claim 2, further comprising: sending the updated gradient to the server device, so that the server device determines the client model parameter for setting the client model according to the updated gradient.

4. The method of any of claim 1, wherein generating the updated gradient comprises:
determining the change direction associated with the gradient based on a set of candidate results associated with the to-be-processed data; and
generating the updated gradient based on the gradient and the change direction.

5. The method of claim 4, wherein determining the change direction associated with the gradient comprises:
determining a set of gradients associated with the set of candidate results respectively; and
determining the change direction associated with the gradient based on a difference between the set of gradients.

6. The method of claim 4, wherein generating the updated gradient based on the gradient and the change direction comprises:
determining a noise factor for updating the gradient, the noise factor representing the intensity of noise data introduced into the gradient; and
generating the updated gradient based on the gradient, the noise factor and the change direction.

7. The method of claim 6, wherein determining the noise factor for updating the gradient comprises:
  determining the noise factor based on a Boolean random variable, the noise factor causing a probability that the updated gradient is equal to the gradient to be no less than ½.

8. The method of claim 6, wherein determining the noise factor for updating the gradient comprises:
  determining the noise factor based on a Gaussian random variable, the noise factor causing a probability to be no less than ½, the probability indicates that a distance between the updated gradient and the gradient is less than a distance between the updated gradient and other candidate gradient than the gradient in the set of candidate gradients.

9. The method of any of claim 1, wherein the to-be-processed data is included in a training data packet from the server device, and the method further comprises: processing other to-be-processed data in the training data packet by means of the method.

10. The method of any of claim 1, wherein the method is performed at a client device connected to the server, and the method is iteratively performed at the client device.

11. An electronic device, comprising:
  at least one processing unit; and
  at least one memory, coupled to the at least one processing unit and storing instructions for execution by the at least one processing unit, the instructions, when executed by the at least one processing unit, causing the device to perform acts, including:
    receiving to-be-processed data from a server device;
    receiving a processing result of a user for the to-be-processed data, the processing result comprising sensitive data of the user for the processing of the to-be-processed data;
    determining a gradient for training a server model at the server device based on a comparison between the processing result and a prediction result for the to-be-processed data; and
    updating the gradient in a change direction associated with the gradient so as to generate an updated gradient to be sent to the server device.

12. The device of claim 11, wherein the acts further comprising:
  receiving a client model parameter for setting a client model from the server device; and
  processing the to-be-processed data based on the client model parameter and the client model so as to obtain the prediction result for the to-be-processed data.

13. The device of claim 12, wherein the acts further comprising: sending the updated gradient to the server device, so that the server device determines the client model parameter for setting the client model according to the updated gradient.

14. The device of claim 11, wherein generating the updated gradient comprises:

determining the change direction associated with the gradient based on a set of candidate results associated with the to-be-processed data; and
  generating the updated gradient based on the gradient and the change direction.

15. The device of claim 14, wherein determining the change direction associated with the gradient comprises:
  determining a set of gradients associated with the set of candidate results respectively; and
  determining the change direction associated with the gradient based on a difference between the set of gradients.

16. The device of claim 14, wherein generating the updated gradient based on the gradient and the change direction comprises:
  determining a noise factor for updating the gradient, the noise factor representing the intensity of noise data introduced into the gradient; and
  generating the updated gradient based on the gradient, the noise factor and the change direction.

17. The device of claim 16, wherein determining the noise factor for updating the gradient comprises:
  determining the noise factor based on a Boolean random variable, the noise factor causing a probability that the updated gradient is equal to the gradient to be no less than ½.

18. The device of claim 16, wherein determining the noise factor for updating the gradient comprises:
  determining the noise factor based on a Gaussian random variable, the noise factor causing a probability to be no less than ½, the probability indicates that a distance between the updated gradient and the gradient is less than a distance between the updated gradient and other candidate gradient than the gradient in the set of candidate gradients.

19. The device of claim 11, wherein the to-be-processed data is included in a training data packet from the server device, and the acts further comprise: processing other to-be-processed data in the training data packet by means of the method.

20. A non-transitory computer-readable storage medium, on which a computer program is stored, the program, when executed by a processor, performing a method of protecting sensitive data, the method comprising:
  receiving to-be-processed data from a server device;
  receiving a processing result of a user for the to-be-processed data, the processing result comprising sensitive data of the user for the processing of the to-be-processed data;
  determining a gradient for training a server model at the server device based on a comparison between the processing result and a prediction result for the to-be-processed data; and
  updating the gradient in a change direction associated with the gradient so as to generate an updated gradient to be sent to the server device.

* * * * *